United States Patent [19]
Jacobs

[11] Patent Number: 5,157,519
[45] Date of Patent: Oct. 20, 1992

[54] SERIAL COMPUTER PERIPHERAL FOR FACSIMILE IMAGE AND ASCII TEXT COMMUNICATION

[75] Inventor: William E. Jacobs, Satellite Beach, Fla.

[73] Assignee: Fujitsu America, Inc., San Jose, Calif.

[21] Appl. No.: 397,835

[22] Filed: Aug. 24, 1989

[51] Int. Cl.⁵ .......................................... H04N 4/419
[52] U.S. Cl. ................................... 358/470; 358/427; 358/400
[58] Field of Search ............... 358/400, 401, 426, 427, 358/431, 435, 442, 443, 445, 448, 462, 467, 403, 470, 471, 435; 370/57, 58.1, 60, 61, 94.1

[56] References Cited

U.S. PATENT DOCUMENTS

| | | | |
|---|---|---|---|
| 4,491,873 | 1/1985 | Takayama | 358/426 |
| 4,939,583 | 7/1990 | Tsuboi et al. | 358/427 |
| 4,947,268 | 8/1990 | Nakajiri et al. | 358/426 |

Primary Examiner—Edward L. Coles, Sr.
Assistant Examiner—Jerome Grant, II
Attorney, Agent, or Firm—Staas & Halsey

[57] ABSTRACT

A serial communication peripheral device operates both as a conventional modem and to transmit and receive facsimile images as scan encoded data. Text data containing ASCII characters can be received from a local device and converted into scan encoded data for transmission to facsimile machines or other computers. The text to facsimile conversion process uses an image builder to produce a partial image of a line of text. The partial image is stored in a buffer with each character at regularly spaced intervals. The desired intercharacter spacing and attributes such as bold and expanded characters are stored in an attribute array with each element of the array corresponding to one of the character images in the buffer. A Modified Huffman compressor scans the image buffer and produces the scan encoded data based upon the detected bits and the attributes stored in the attribute array.

13 Claims, 4 Drawing Sheets

FIG. 2A

|  | 1st | | | | | | | | | | | | | | | 16th |
|---|---|---|---|---|---|---|---|---|---|---|---|---|---|---|---|---|
| 1st | 0|0|0|0|0|1|1|0|0|0|0|0|0|0|0|0 |
| | 0|0|0|0|1|1|1|1|0|0|0|0|0|0|0|0 |
| | 0|0|0|0|1|1|0|0|1|1|0|0|0|0|0|0 |
| | 0|0|0|0|1|1|0|0|1|1|0|0|0|0|0|0 |
| | 0|0|0|1|1|0|0|0|0|1|1|0|0|0|0|0 |
| ROWS | 0|0|1|1|1|1|1|1|1|1|1|0|0|0|0|0 |
| | 0|0|1|1|0|0|0|0|0|0|1|1|0|0|0|0 |
| | 0|1|1|0|0|0|0|0|0|0|1|1|0|0|0|0 |
| | 1|1|1|1|0|0|0|0|1|1|1|1|1|0|0 |
| | 0|0|0|0|0|0|0|0|0|0|0|0|0|0|0|0 |
| | 0|0|0|0|0|0|0|0|0|0|0|0|0|0|0|0 |
| 12th | 0|0|0|0|0|0|0|0|0|0|0|0|0|0|0|0 |

COLUMNS

FIG. 2B

| 0 0 |
| --- |
| 0 0 |
| 0 0 |
| 0 0 |
| 0 0 |
| 0 0 |
| 7 C |
| F 8 |
| 1 8 |
| 6 0 |
| 3 0 |
| 3 0 |
| F 0 |
| 3 F |
| 6 0 |
| 1 8 |
| C 0 |
| 0 C |
| C 0 |
| 0 C |
| 8 0 |
| 0 7 |
| 0 0 |
| 0 3 |

SERIAL COMPUTER PERIPHERAL FOR FACSIMILE IMAGE AND ASCII TEXT COMMUNICATION

BACKGROUND OF THE INVENTION

1. Field of the Invention

The present invention is related to communication devices capable of being connected via a serial communication line to devices such as personal computers to provide communication via telephone lines and, more particularly, to a serial communication device capable of transmitting and receiving both facsimile images and ASCII characters and including the ability to convert ASCII characters into facsimile images.

2. Description of the Related Art

At the present time there is widespread use of communication devices known as modems in conjunction with computer terminals, personal computers and larger computers. These modems typically transmit data using the American Standard Character Interchange Interface (ASCII) codes with or without compression or additional encoding. There is also widespread use of facsimile machines which scan a sheet of text or graphics to produce scan encoded data that is transmitted via telephone lines to another facsimile machine where a facsimile of the sheet is printed. Most facsimile machines in use today are classified as Group 3 machines as defined by the Consultative Committee for International Telephone and Telegraph (CCITT) and use Modified Huffman (MH) run length codes representing black and white pixels. Recently, communication devices have been made available to transmit and receive scan encoded data from and to a personal computer. Some of the communication devices which allow personal computers to transmit and receive scan encoded data also provide conventional ASCII text communication capability, i.e., operate as a modem.

There are currently two methods for generating scan encoded data for transmission from a personal computer. The first method is to scan a document in the conventional way, either using an optical scanner connected to the personal computer, or by using a stand-alone facsimile machine to transmit a facsimile image to the computer. In either case, the scanned image is received by the personal computer and stored for subsequent transmission. The second method is to use software on the personal computer to convert text or graphics stored in other formats into scan encoded data for transmission. This obviously requires additional processing by the personal computer in addition to the time required to transmit the scan encoded data to a facsimile machine or another personal computer.

SUMMARY OF THE INVENTION

An object of the present invention is to provide a peripheral device capable of converting ASCII text into scan encoded data for transmission to a facsimile machine.

Another object of the present invention is to combine such converted ASCII text with previously scan encoded data on a scan line - by - scan line basis.

Another object of the present invention is to combine facsimile communication capability, including ASCII text conversion, with conventional modem communications of, e.g., ASCII text.

The above objects are attained by providing a method for transmitting telecommunication data between a local device and a transmission line, comprising the steps of: receiving character data from the local device; receiving packets of scan encoded data from the local device; converting the character data into scan encoded data when the character data is received from the local device and transmitting the scan encoded data over the transmission line. Preferably, the packets of scan encoded data each comprises a single complete line of the scan encoded data.

In the preferred embodiment, ASCII text is converted into scan encoded data by first copying character images from a stored table into a buffer without regard for all of the attributes of the characters and then generating the scan encoded data, while taking into account the attributes of the characters, including intercharacter spacing. The attributes used during the generation of the scan encoded data are stored in an array with a one-to-one correspondence to the character images in the buffer. This allows bolding and expansion of characters, as well as selecting between ten and twelve pitch intercharacter spacing during the scan encoding or compression process, based upon a character image, selected from among regular, italics and condensed characters, which is stored in the buffer.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIGS. 2A and 2B are binary and hexadecimal representations of the character "A" in the font table;

DESCRIPTION OF THE PREFERRED EMBODIMENT

Figure 1:
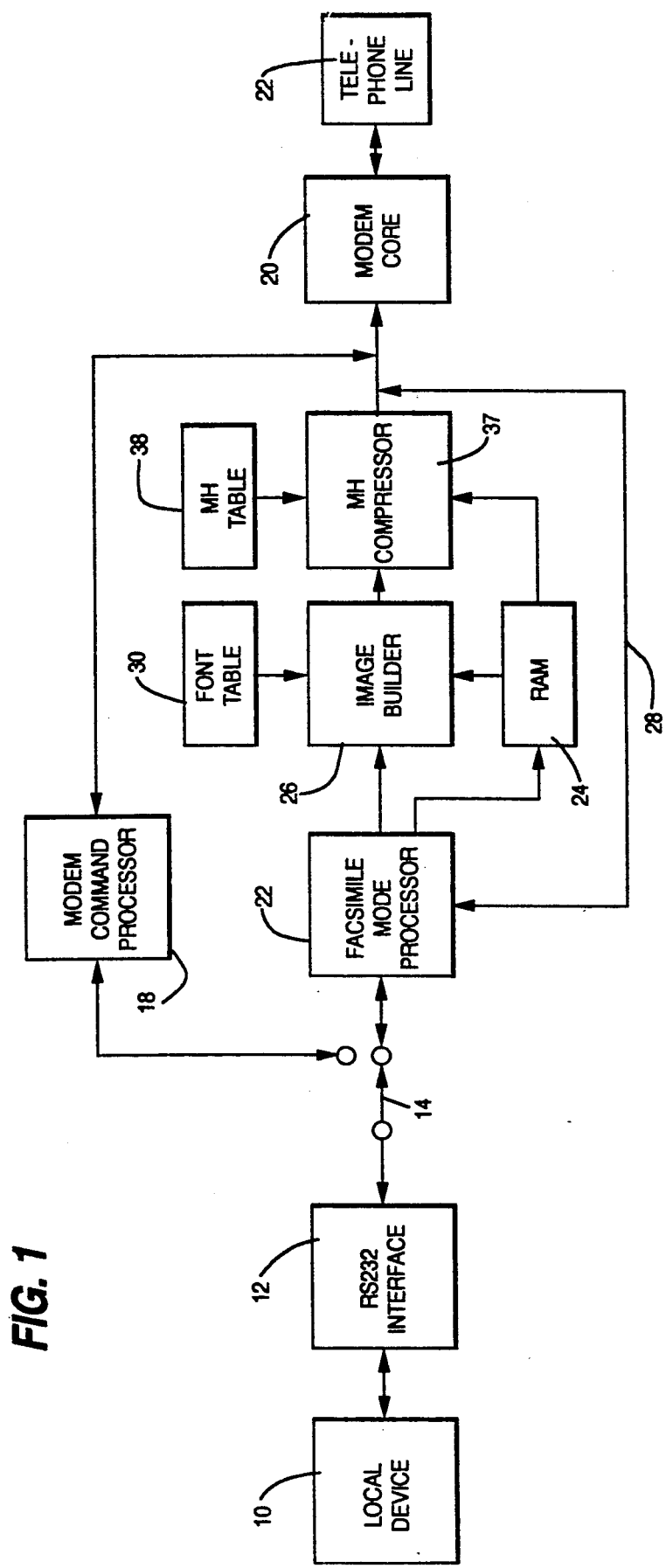
FIG. 1 is a functional block diagram of the present invention.

The present invention simplifies the process of transmitting data from a local device, such as a computer terminal, personal computer or larger computer, to other computers and facsimile machines. As illustrated in FIG. 1, all communications with the local device 10 are provided by an RS232 interface 12. For the purpose of transmitting all ASCII data, the present invention may appear to the local device 10 to be a conventional modem operating under a well established command protocol. In this operational mode, a virtual switch 14 connects the RS232 interface 12 to a modem command processor 18. Data is passed through the modem command processor 18 to a modulator/demodulator (MODEM CORE) 20 which transmits and receives character data over a transmission line, such as a telephone line 22.

Transmission of text as scan encoded data to a facsimile machine or another computer is equally simple. In the preferred embodiment, the local device 10 may treat the present invention as a dot matrix printer using a well established set of printer commands, such as the EPSON escape sequences. The preferred embodiment of the present invention supports text attributes such as 10, 12 and 17 pitch character spacing, bold, italicized and double-wide characters, underlining and over-striking. When the local device 10 requests that ASCII text is to be transmitted as a facsimile, the virtual switch 14 connects the RS232 interface 12 to the facsimile mode processor 22. The facsimile mode processor 22 processes the facsimile commands including the setting of attribute indicators in random access memory (RAM) 24. The ASCII text is supplied to a partial image builder 26. Previously encoded facsimile images can also be transmitted from the local device 10. Preferably, such images are transmitted using conventional printer protocols indicating the transmission of variable length graphic data in packets of scan encoded data. Each packet preferably includes a single, complete scan line which is routed via line 28 from the facsimile mode processor 22 to the MODEM CORE 20 for transmission.

When the ASCII text containing character data is received by the partial image builder 26, a font table 30 is accessed to select a character image corresponding to the ASCII character received from the local device 10. Preferably, there are three sets of font tables, one for regular characters at 10 and 12 pitch, a second for italicized characters at 10 and 12 pitch, and a third for condensed characters at 17 pitch. Which table is selected is determined by the attribute indicators in RAM 24. The character image is stored in a buffer and a corresponding attribute is stored in an array. The attribute stored in the array preferably indicates whether the character is to be generated as a bold character or an expanded (double-wide) character and whether the character image was copied from the condensed font table. In addition, when a carriage return is received by the partial image builder 26, a bit in the attribute byte corresponding to the immediately previously received character is set to indicate the end of a line.

The font table 30 preferably stores the 10 and 12 pitch regular and italicized characters in tables 16 bits wide and 12 bits high, while the condensed, 17 pitch characters in the preferred embodiment are each formed in an 8 by 12 matrix. Ordinary characters, such as the regular 10/12 pitch letter "A" illustrated in FIG. 2A, numerals and typographic characters are at most 15 pixels across (seven across for condensed characters). The sixteenth column 32 of pixels (or eighth column of pixels of condensed characters) at the right edge of the matrix is reserved for pixels which are to be repeated in the spacing between characters.

Figure 3:
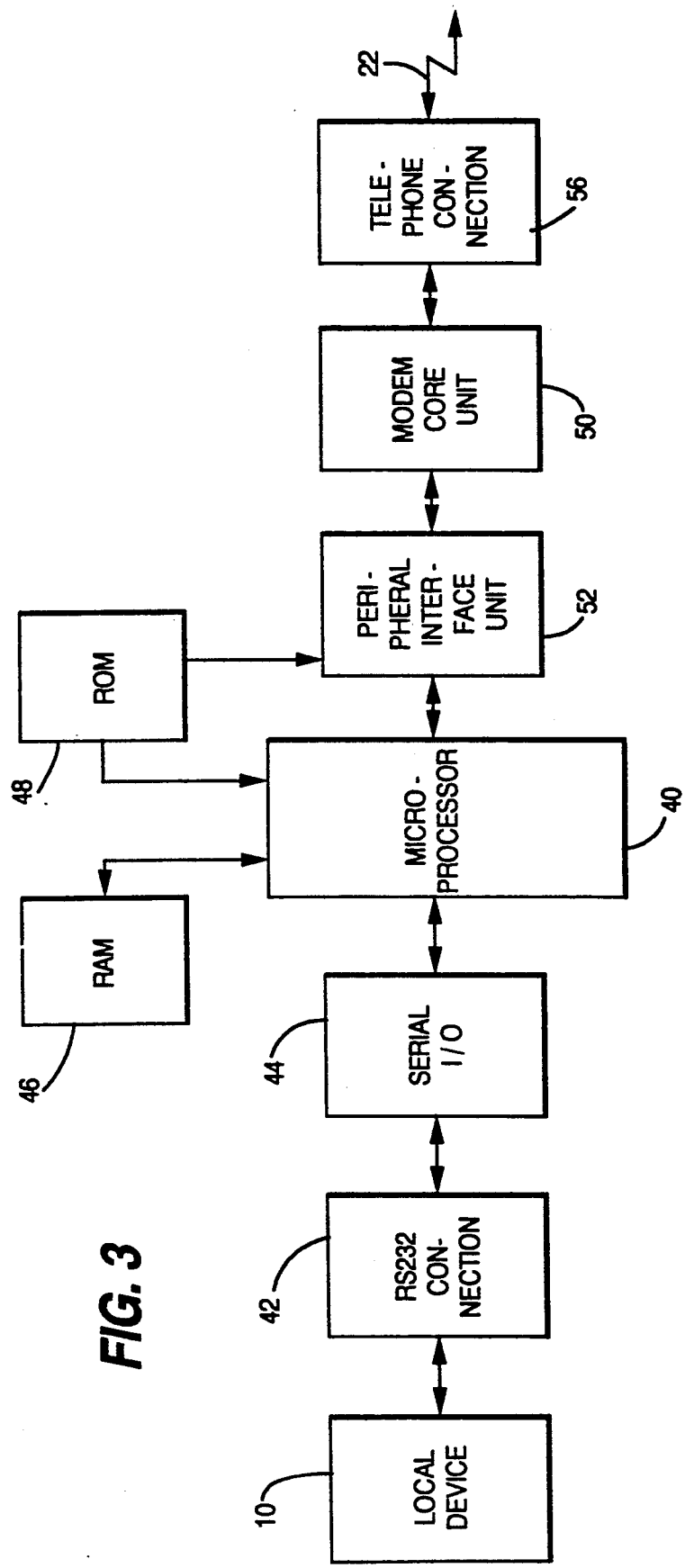
FIG. 3 is a block diagram of an embodiment of the present invention.

The outline 33 of the character "A" is visible in the binary representation in FIG. 2A. Each row of the 10/12 pitch font tables is two 8-bit bytes long. If a byte oriented processor, like Zilog Z-80 is used, row 9, referenced as 34a in FIG. 2A, will require two storage locations, referenced as 34b in FIG. 2B, for a total of 24 locations (12 locations for 17 pitch) per character. In the preferred embodiment, the table for each character is stored from top to bottom, so that the scan lines can be easily generated from top to bottom. The character "A" which has an ASCII value of 65 is accessed by adding 1560 (24 times 65) to a base value which points to the first byte in the first row of the ASCII character with value zero (0). This is the storage location 34b of the beginning of the first row of the character "A". FIG. 3 is a view of the character "A" in the font table 30 as a one dimensional array of bytes in hexadecimal notation, where the first byte 35b corresponds to the left half 35a of the first row and the last byte 36b corresponds to the right half 36a of the twelfth row.

The character images are stored in the buffer by the partial image builder 26 with one character immediately following another so that a character is stored every 16 bits. Thus, there is no space between 10 and 12 pitch characters, although there are 8 bits which are not used following each row of a condensed character.

Scan encoded data is generated by a Modified Huffman (MH) compressor 37 from the image buffer and attribute array produced by the partial image builder 26. The MH compressor 37 reads the bits line by line in the image buffer. While reading the bits for a character, if the bold attribute is indicated in the corresponding element of the attribute array, when a single black pixel, preceded and followed by a white pixel is detected, a code representing two black pixels is produced and the number of white pixels following the doubled black pixel is reduced by one to produce a bolder vertical line. If the corresponding element of the attribute array indicates that an expanded character is to be produced, the run length of both black and white pixels are doubled.

When the MH compressor 37 reaches the final bit of a character, i.e., the sixteenth bit of a 10 or 12 pitch character or the eighth bit of a 17 pitch character, the pixel is repeated through an amount of intercharacter spacing determined by the pitch, either 10, 12 or 17 pitch, indicated in the RAM 24. For example, graphic characters, such as the line draw characters in the IBM PC extensions to the ASCII character set, are repeated through the intercharacter spacing in an appropriate manner to produce continuous horizontal lines. The amount of intercharacter spacing of course differs for 10, 12 and 17 pitch characters. As noted above, one of the bits in the corresponding element of the attribute array indicates whether a condensed character is in the character image buffer. Since the condensed characters only use the first eight bits of the 16 bits provided for each character in the image buffer, the MH compressor 37 skips the final eight bits when the corresponding element of the attribute array indicates that a condensed character is being processed.

As noted above, underlining and overstriking is supported by in the preferred embodiment of the present invention. Although the font table 30 only has 12 rows for each character to minimize the amount of space required, the image buffer has 16 rows. When the characters are to be produced in eight lines per inch vertical spacing, all 16 bits (8 bits if 17 pitch) of the eleventh row are set to one (1) which represents black to produce an underline and the pixels corresponding to the bits in the twelfth row of one ASCII line are immediately above the first row of pixels produced by the following ASCII line. If the characters are being produced with six lines per inch vertical spacing, the fourteenth row of the image buffer is filled with bits representing black pixels by the partial image builder 26 for each underlined character. Similarly, overstrike characters are produced by overlaying the bits representing black pixels of one character at a position in the image buffer already occupied by a previous character, when the image buffer is being filled by the partial image builder 26. When the vertical spacing is set at eight lines per inch, only the top 12 rows of the image buffer is used by the MH compressor 37, while all 16 rows are used for six lines per inch vertical spacing.

Once the MH compressor 37 determines the run length of white or black pixels, a Modified Huffman (MH) table 38 is accessed so that the appropriate MH code can be output. Preferably, each MH code is stored in two bytes. The first byte indicates the number of significant bits and the second contains up to eight of the significant bits. A portion of the table for black run lengths based upon the CCITT standard is illustrated in Table 1 below. When the number of significant bits is less than eight (8), e.g., three (3) in the case of a run length of four (4) black pixels, only the most significant (left-most) bits in the second byte are transmitted. When the number of significant bits is more than eight (8), e.g., 10 for a run length of sixteen (16) black pixels, leading zeros are added to make up the difference. Thus, in the case of a run length of sixteen (16) black pixels, two leading zeros are added to the second byte to produce the Modified Huffman code "0000010111" which represents 16 black pixels.

TABLE 1

| Black Run Length | BYTE 1 | BYTE 2 |
|---|---|---|
| 0 | 10 | 00110111 |
| 1 | 3 | 01000000 |
| 2 | 2 | 11000000 |
| 3 | 2 | 10000000 |
| 4 | 3 | 01100000 |
| 5 | 4 | 00110000 |
| 6 | 4 | 00100000 |
| 7 | 5 | 00011000 |
| 8 | 6 | 00010100 |
| 9 | 6 | 00010000 |
| 10 | 7 | 00001000 |
| 11 | 7 | 00001010 |
| 12 | 7 | 00001110 |
| 13 | 8 | 00000100 |
| 14 | 8 | 00000111 |
| 15 | 9 | 00011000 |
| 16 | 10 | 00010111 |
| 17 | 10 | 00011000 |
| 18 | 10 | 00001000 |
| 19 | 11 | 01100111 |
| 20 | 11 | 01101000 |
| 21 | 11 | 01101100 |
| 22 | 11 | 00110111 |
| 23 | 11 | 00101000 |
| 24 | 11 | 00010111 |
| 25 | 11 | 00011000 |
| 26 | 12 | 11001010 |
| 27 | 12 | 11001011 |

By building uniformly spaced and only partially completed images of characters in the image buffer, the amount of time required to build the image of a line of ASCII text is significantly reduced. This allows communication between the local device 10 and RS232 interface 12 to operate at 9600 bps and the scan encoded data is produced at a fast enough rate to maintain the facsimile transmission at 9600 bps while requiring receipt of only a single line of ASCII text before initiating transmission of the scan encoded data. Thus, a relatively small amount of memory can be used and the functions can be performed by an inexpensive processor such as a Zilog Z-80. Thus, the hardware used in the preferred embodiment can be as illustrated in FIG. 3.

As illustrated in FIG. 3, a microprocessor 40 which performs most of the functions illustrated in FIG. 1 is connected to the local device 10 via a conventional RS232 connection 42 and a serial I/0 interface 44. If a Z-80 microprocessor is used as microprocessor 40, the serial I/0 interface may be a Zilog SIO CMOS chip. The RAM 24 used for storing status of the device, including attributes of the current line, such as line spacing, etc., is provided by RAM 46 which is also used for the image buffer, attribute array and to provide memory for such functions as storing a facsimile message for later transmission as described below. The program controlling the operation of the present invention is stored in one or more read only memories represented by ROM 48.

As illustrated in FIG. 3, other programmable large scale integrated circuits are preferably used to provide a modem core unit 50 and a peripheral interface unit 52. The peripheral interface unit 52 is preferably an Intel 8255. The modem core unit 50 may be provided by any commercially available modem core, such as those available from Rockwell and Hitachi. For example, a Fujitsu MB87518 digital signal processor, Intel 8251 microprocessors and an analog interface unit, such as a C5761AG from Asahi Kasai of Tokyo, Japan may be used. The modem core unit 50 connects the peripheral interface unit 52 via telephone connection 56 to a telephone line 22. The telephone connection 56 includes conventional relay drivers and isolation units.

The programs stored in ROM 48 includes routines capable of performing the functions described above with respect to FIG. 1. As would be apparent to one of ordinary skill in the art, the image builder 26 and MH compressor 37 routines are preferably written in assembler to obtain maximum execution speed by an inexpensive microprocessor. Thus, the exact coding used will depend upon the model of microprocessor used for microprocessor 40, but the task of programming the microprocessor 40 to perform these functions should require little effort from the preceding functional description.

Figure 4:
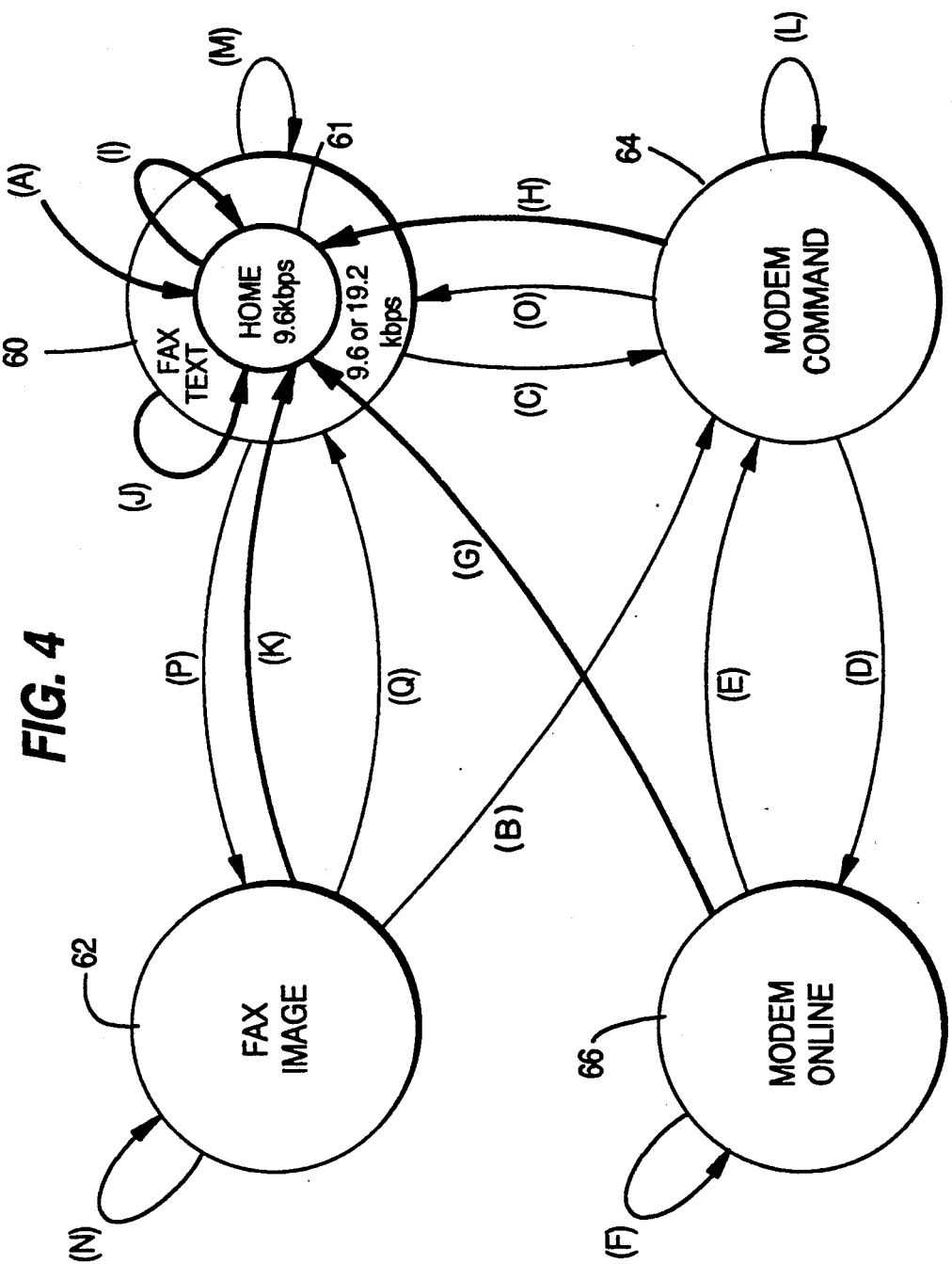
FIG. 4 is a state diagram of the operational modes in the preferred embodiment.

In addition to the above-described functions, the programs stored in the ROM 48 include the ability to operate in several different modes. A state diagram of the four primary modes is illustrated in FIG. 4. The basic mode of operation in the preferred embodiment is to transmit ASCII text as scan-encoded facsimile images. This is represented as FAX TEXT mode 60. Communication between the local device 10 and the microprocessor 40 may take place at 9600 or 19,200 bytes per second (9.6 or 19.2 kbps). The home or factory default mode 61 is to operate at 9.6 kbps. The factory default setting is represented by state transition (A).

As noted above, a relatively slow microprocessor, such as a Z-80 operating at approximately 5 MHz can perform the ASCII to facsimile conversion fast enough to keep up with transmission of scan encoded data at up to 9600 bps. However, as also described above, scan encoded data stored on the local device 10 includes overhead, i.e., ASCII character sequences indicating that scan encoded data is being transmitted. Since the escape sequences surround each scan line to provide maximum flexibility in the intermixing of scan encoded data containing, e.g., logos and signatures, with ASCII text, the amount of data available for transmission will gradually be reduced if the data is received from the local device 10 at 9600 bps and is output over the telephone line 22 at 9600 bps. Therefore, the fax text mode 60 should be used only with relatively small blocks of scan encoded data, e.g., 6,000 to 12,000 bits.

To avoid the possibility of running out of data to send when transmitting larger blocks of scan encoded data, a fax image mode 62 is provided. In the fax image mode 62, if the RS232 interface 12 operates at 19.2 kbps, the modem 20 may operate at the maximum 9600 bps rate. However, if the local device 10 is unable to support 19.2 kbps, and therefore the RS232 interface 12 operates at 9600 bps, the modem 20 is restricted to operation at 7200 bps maximum.

The modem command processor routines 18 are used when the present invention is in a modem command mode 64. In the modem command mode 64, i.e., during transmission of ASCII character text, the present invention emulates an asynchronous modem using common ASCII command sequences. Such operation is well known in the art and therefore, the programming of the microprocessor 40 to perform these operations will not be discussed in detail. Initially, the modem command mode 64 is entered from either of the facsimile modes 60 and 62 via state transitions (B) and (C) and the present invention automatically enters the modem online mode 66 via state transition (D). Operation can return to the modem command mode 64 via state transition (E) as a result of receiving a timed ASCII sequence or in response to a momentary drop in the data terminal ready (DTR) line with a modem reset status flag set to permit resetting to the modem command mode. If the modem reset status flag is not set, a drop in the DTR line will result in a reset of the modem on line mode 66, as represented by state transition (F).

A technique for resetting the mode to the home mode 61 is provided to ensure that the present invention will respond properly to commands from the local device 10. A status flag, which may be set by transmitting ASCII data, such as AT@Z1, is used to indicate whether resetting using this technique is to be permitted. If it is not to be permitted, the status flag is set using, e.g., the ASCII character string AT@Z0. When the status flag is set to permit resetting, a reset signal of, e.g., a low signal on the data terminal ready (DTR) line lasting for a predetermined duration of, e.g., three or four seconds, results in transition to the home mode 61. This is represented by the state transitions (G)-(K). If the status flag is set to prevent resetting or if the data terminal ready line goes low for less than three seconds, there is a reset to the previous state. This is represented by state transitions (L)-(N).

In the preferred embodiment, the operation mode is stored in nonvolatile memory. Therefore, when the power to the device is turned off and then back on, there is a reset to the previous state, as represented by state transitions (L)-(N). In addition, the reset state transitions (M) and (N) in the facsimile modes 60 and 61 can be produced by a break in transmission of facsimile data. The remaining state transitions (O)-(Q) can be produced by a user of the local device 10 by transmission of predetermined ASCII character sequences or manipulation of external switches.

Since the present invention is capable of receiving both text data and distant scan encoded data from the transmission line 22, the state transitions (B), (C) and (O) can also be performed automatically upon the receipt of data from the transmission line 22. If the device is in the modem on line mode 66 or modem command mode 64, and distant scan encoded data, i.e., a facsimile image, is received from the transmission line 22, there is an automatic transition via state transition (O). An initial transition via state transition (E) is performed if needed. This permits the distant scan encoded data to be received, packetized into packets each containing a single scan line and the packets transmitted to the local device 10.

In the facsimile modes 60 and 62, the present invention may operate as a polling facsimile machine. If such operation is desired, a polling flag is set ON and scan encoded data can be stored in the RAM 46 for transmission upon receipt of a call from another facsimile machine or computer. If a call is received when polling is turn OFF and no scan encoded data is stored in the RAM 46, then distant scan encoded data can be received from the transmission line 22. If the data being received is character data, provided no scan encoded data is stored in the RAM 46, a change in operation mode via state transition (B) or (C) can be made to the modem command mode 64 and the character data can be received, provided a modem automatic answer state is set to permit such operation. When any of the conditions described above are not met, there is no response to calls on the transmission line 22.

The many features and advantages of the present invention are apparent from the detailed specification, and thus it is intended by the appended claims to cover all such features and advantages of the system which fall within the true spirit and scope of the invention. Further, since numerous modification and changes will readily occur to those skilled in the art from the disclosure of this invention, it is not desired to limit the invention to the exact construction and operation illustrated and described. For example, the scan encoded data in the preferred embodiment uses Modified Huffman codes; however, other coding techniques such as the Modified Read codes of CCITT Group 4 machines could be used with necessary changes to the compressor 37 and code table 38. Accordingly, suitable modifications and equivalents may be resorted to, all falling within the scope and spirit of the invention.

What is claimed is:

1. A method for transmitting telecommunication data between a local device and a transmission line, comprising the steps of:
   (a) receiving character data from the local device;
   (b) receiving packets of scan encoded data from the local device;
   (c) converting the character data into scan encoded data for a complete line, one pixel high;
   (d) transmitting the scan encoded data obtained in steps (b) and (c) over the transmission line to provide a page of the scan encoded data to a remote device;
   (e) receiving distant scan encoded data from the transmission line;
   (f) packetizing the distant scan encoded data into packets, each packet containing a single scan line;
   (g) transmitting the packets to the local device;
   (h) transmitting character data between the local device and the transmission line without scan encoding; and
   (i) selecting a current operation mode from among a plurality of possible operation modes including a text mode during which only step (h) is performed and a first facsimile mode during which steps (a)-(g) are performed.

2. A method as recited in claim 1,
   wherein the first facsimile mode has a first local transmission rate, a second local transmission rate slower than the first local transmission rate and a maximum line transmission rate, and
   wherein the possible operation modes include a second facsimile mode using only the first local transmission rate with the maximum line transmission rate and either of the first and second local transmission rates with slower line transmission rates.

3. A method as recited in claim 2, wherein the possible operation modes further include a text transmission command mode for controlling the text transmission mode, and wherein said method further comprises the step of (j) automatically selecting the first facsimile mode upon initialization of the method and from any other mode when a reset signal of predetermined duration is received from the local device and a status flag indicates that resetting is permitted.

4. A method as recited in claim 3, wherein the local device uses an RS232 serial interface and the reset signal is a low signal of over three seconds duration on a data terminal ready line.

5. A method as recited in claim 2, further comprising the steps of:
- (j) automatically switching from the text mode to one of the first and second facsimile modes upon receipt of the distant scan encoded data from the transmission line;
- (k) automatically receiving the distant scan encoded data when received in the first and second facsimile modes if none of the scan encoded data is available to transmit and polling is turned OFF;
- (l) automatically responding to a call when polling is turned ON by transmitting the scan encoded data if previously stored;
- (m) automatically switching from either of the first and second facsimile modes to the text mode upon receipt of character data from the transmission line only if none of the scan encoded data is available to transmit and a modem automatic answer state is set; and
- (n) making no response to calls on the transmission line when conditions required in steps (k), (l) and (m) are not met.

6. A method as recited in claim 1, wherein step (c) comprises the steps of:
- (c1) storing a table of character images;
- (c2) copying one of the character images into a buffer for each character to be transmitted in the character data;
- (c3) storing in an array an attribute for each of the character images in the buffer; and
- (c4) generating the scan encoded data using the buffer, the array and a specified spacing between the characters.

7. A method as recited in claim 6,
wherein step (c2) stores the character images at regular intervals without the specified spacing, and
wherein step (c4) comprises the steps of:
- (c4A) inserting the specified spacing between the characters; and
- (c4B) repeating black pixels in a final position in each of the intervals through the specified spacing following the character image stored in a preceding interval.

8. A method for transmitting telecommunication data between a local device and a transmission line, comprising the steps of:
- (a) receiving character data from the local device;
- (b) receiving packets of scan encoded data from the local device;
- (c) converting the character data into scan encoded data, said converting including the steps of
  - (c1) storing a table of character images;
  - (c2) copying one of the character images into a buffer for each character to be transmitted in the character data;
  - (c3) storing in an array an attribute for each of the character images in the buffer; and
  - (c4) generating the scan encoded data using the buffer, the array and a specified spacing between the characters by
    - (c4A) inserting the specified spacing between the characters;
    - (c4B) repeating black pixels in a final position in each of the intervals through the specified spacing following the character image stored in a preceding interval;
    - (c4C) encoding each scan line with two consecutive black pixels when only one black pixel is indicated in the buffer if a bold attribute is indicated in the array; and
    - (c4D) doubling all pixels in each of the character images in the buffer if an expanded attribute is indicated in a corresponding element of the array; and
- (d) transmitting the scan encoded data obtained in steps (b) and (c) over the transmission line to provide a page of the scan encoded data to a remote device.

9. A method as recited in claim 8,
wherein step (c1) comprises storing separate tables for normal, italicized and condensed fonts, and
wherein step (c2) comprises the steps of:
- (c2A) copying from one of the separate tables in dependence upon whether a condensed attribute is indicated and whether an italicized attribute is indicated;
- (c2B) adding underlining to the character image if an underlining attribute is indicated.

10. A method as recited in claim 9,
wherein said inserting in step (c4A) inserts different amounts of spacing for 10, 12 and 17 pitch text, and
wherein step (c2A) copies from a single set of tables representing the normal and italicized fonts for both 10 and 12 pitch text.

11. A method for transmitting telecommunication data between a local device and a transmission line, comprising the steps of:
- (a) receiving character data from the local device;
- (b) receiving packets of scan encoded data from the local device;
- (c) converting the character data into scan encoded data, said converting including the steps of
  - (c1) storing a table of character images;
  - (c2) copying one of the character images into a buffer for each character to be transmitted in the character data;
  - (c3) storing in an array an attribute for each of the character images in the buffer; and
  - (c4) generating the scan encoded data using the buffer, the array and a specified spacing between the characters by
    - (c4A) accessing a table of Modified Huffman codes stored in two bytes, a first byte representing a number of significant bits and a second byte storing up to eight final bits of one of the Modified Huffman codes; and
    - (c4B) adding leading zeros, when the number of significant bits stored in the first byte is greater than eight, the number of leading zeros added being determined by subtracting eight from the number of significant bits stored in the first byte; and (d) transmitting the scan encoded data obtained in steps (b) and (c) over the transmission line to provide a page of the scan encoded data to a remote device.

12. A method for transmitting telecommunication data between a local device and a transmission line, comprising the steps of:

(a) receiving character data from the local device;

(b) storing a table of character images;

(c) copying one of the character images into a buffer for each character to be transmitted in the character data;

(d) storing in an array an attribute for each of the character images in the buffer;

(e) accessing a table of Modified Huffman codes stored in two bytes, a first byte representing a number of significant bits and a second byte storing up to eight of final bits of one of the Modified Huffman codes;

(f) adding leading zeros, when the number of significant bits stored in the first byte is greater than eight, the number of leading zeros added being determined by subtracting eight from the number of significant bits stored in the first byte;

(g) receiving packets of previously scan encoded data from the local device; (h) transmitting the Modified Huffman codes representing the character data received in step (a) together with the previously scan encoded data received in step (g) over the transmission line.

13. A method for transmitting telecommunication data between a local device and a transmission line, comprising the steps of:

(a) receiving character data from the local device;

(b) receiving packets of scan encoded data from the local device;

(c) converting the character data into scan encoded data, said converting including the steps of (c1) storing a table of character images;

(c2) storing the character images into a buffer at regular intervals without the specified spacing for each character to be transmitted;

(c3) storing in an array an attribute for each of the character images in the buffer; and (c4) generating the scan encoded data using the buffer, the array and a specified spacing between the characters by (c4A) inserting the specified spacing between the characters; and (c4B) repeating black pixels in a final position in each of the intervals through the specified spacing following the character image stored in a preceding interval.

* * * * *

UNITED STATES PATENT AND TRADEMARK OFFICE
CERTIFICATE OF CORRECTION

PATENT NO. : 5,157,519

DATED : October 20, 1992

INVENTOR(S) : William E. Jacobs

It is certified that error appears in the above-identified patent and that said Letters Patent is hereby corrected as shown below:

Title page, [75] Inventors: Please insert --William J. Tiso, New Milford, Conn.--.

Signed and Sealed this

Fourteenth Day of December, 1993

Attest:

Attesting Officer

BRUCE LEHMAN

Commissioner of Patents and Trademarks